United States Patent [19]

Furcsik et al.

[11] Patent Number: 5,094,872
[45] Date of Patent: Mar. 10, 1992

[54] METHOD FOR MAKING A REDUCED FAT PRODUCT

[75] Inventors: Susan L. Furcsik, Lake Station, Ind.; David J. Mauro, Dolton; Leonard Kornacki, Calumet City, both of Ill.; Eugene J. Faron, Valparaiso, Ind.; Frances L. Turnak, Hammond, Ind.; Roger Owen, Schererville, Ind.

[73] Assignee: American Maize-Products Company, Stamford, Conn.

[21] Appl. No.: 617,405

[22] Filed: Nov. 21, 1990

Related U.S. Application Data

[63] Continuation of Ser. No. 382,253, Jul. 19, 1989, abandoned.

[51] Int. Cl.[5] .......................... A23C 1/307; A23C 7/00
[52] U.S. Cl. ...................... 426/578; 426/579; 426/601; 426/602; 426/658; 426/661; 426/804; 127/32; 127/33; 127/69; 127/71; 536/111
[58] Field of Search .............. 426/578, 661, 804, 602, 426/661, 601, 579, 658; 127/32, 33, 69, 71; 536/111

[56] References Cited

U.S. PATENT DOCUMENTS

| | | | |
|---|---|---|---|
| 3,769,027 | 10/1973 | Mangieu et al. | 426/578 |
| 3,962,465 | 6/1976 | Richter et al. | 426/578 |
| 3,986,890 | 10/1976 | Richter et al. | 426/578 |
| 4,510,166 | 4/1985 | Lenchin et al. | 426/578 |
| 4,726,957 | 2/1988 | Lacourse et al. | 426/578 |

*Primary Examiner*—Jeanette Hunter
*Attorney, Agent, or Firm*—Lucas & Just

[57] ABSTRACT

The method for making a reduced fat foodstuff entails replacing at least a portion of the fat and/or oil in the foodstuff with a high amylose starch hydrolysate having an apparent amylose content above about 40% and a DE greater than 5 and less than 15.0. A high amylose corn starch is the preferred starch base.

20 Claims, No Drawings

METHOD FOR MAKING A REDUCED FAT PRODUCT

This is a continuation of application Ser. No. 382,253, filed July 19, 1989, now abandoned.

This invention relates to foodstuffs and more particularly to a method for making a reduced fat foodstuff by replacing a portion of the fats and/or oils in the foodstuff with a high amylose starch hydrolysate.

Consumer awareness of the caloric content of foods has increased dramatically over the past few years and has brought about a demand for foods having a reduced fat content. This demand has created a need in the food industry to replace at least a portion of the fat and/or oil in prepared foodstuffs with a component that does not detract from the taste, appearance, smell and mouthfeel of the foodstuffs and which has reduced caloric content.

It has been suggested that certain starch hydrolysates may be used as fat and/or oil replacers in foods, see U.S. Pat. No. 4,510,166 issued April 9, 1985, U.S. Pat. No. 3,962,465 issued June 8, 1976 and U.S. Pat. No. 3,986,890 issued Oct. 19, 1976. The '166 patent teaches using starch hydrolysate having a DE less than 5 as a fat and/or oil replacer. A problem with these less than 5 DE starch hydrolysates is that they have poor taste and impart an undesirable starchy or roasted taste to the foodstuff. Additionally, it has been found that these less than 5 DE starches produce a gel that has a gray or tan color which is also undesirable.

The '465 patent teaches a detailed stepwise process for converting starch to a starch hydrolysate having a DE between 5 to 25. This process is extremely long and tedious and is not deemed acceptable for a large commercial operation.

The '890 patent teaches mixing two different starch hydrolysates to make a product having a DE between 5 to 10.

It has now been discovered that a foodstuff with reduced fat content may be made by replacing at least a portion of the fat and/or oil in the foodstuff with water and an effective amount of a high amylose starch hydrolysate having a DE between about 5 to about 15 and having a peak average molecular weight less than about 10,000, said starch hydrolysate being made from a base starch having an apparent amylose content greater than about 40%.

It has been found that an aqueous dispersion of the high amylose starch hydrolysate of the present invention possesses good gel strength, an important attribute in a fat replacer. The gels produced by the fat replacer of the present invention are smooth, creamy and white and do not have a sticky-pasty consistency.

It has also been found that the gels of the fat replacer of the present invention do not have a starchy or roasted flavor. This makes the fat replacer of the present invention a suitable substitute for natural fats and oils which generally have a non-distinct flavor.

Suitable forms of the fat replacer of the present invention are an aqueous dispersion of the hydrolysate and a paste.

The aqueous dispersion is formed by mixing the dried starch hydrolysate with water. The paste is formed by cooking the aqueous dispersion. Cooking entails raising the temperature of the dispersion to above about 90° C. and holding the dispersion at that temperature for about 5 minutes while subjecting the dispersion to agitation. More preferably the temperature of the dispersion is raised to about 100° C. Stirring is done in a conventional manner such as by an impeller. Gels are formed by cooling the paste.

In situ formation of the aqueous dispersion and paste can be performed. If the foodstuff contains water, then the high amylose starch hydrolysate of the present invention can be added directly to the foodstuff and mixed in. The aqueous dispersion will form therein. If the foodstuff containing the high amylose starch hydrolysate is then cooked, a paste will form. The paste, whether made in situ or prior to addition to the foodstuff is the preferred form of the fat replacer of the present invention.

An effective amount of the high amylose starch hydrolysate of the present invention is dispersed in water to form the fat replacer of the present invention. Preferably, the dispersion has a solids content of about 5% to about 50% and more preferred is a dispersion with a solids content of about 15% to about 30%.

Starch obtained from corn, potato, wheat, rice, sago, tapioca, or sorghum are acceptable base starches so long as they have an apparent amylose content greater than about 40%. Suitable sources for such high amylose starch include high amylose corn starch and high amylose barley starch. Preferably, high amylose corn starch is used.

The apparent amylose content must be above about 40% and more preferably about 50% and above. Good results have been obtained with a corn starch having an apparent amylose content of about 50–65%. Such a high amylose Products Company under the trademark Amaizo ®5.

The term "amylose content" or "apparent amylose content" of the base starch as used in the specification and claims means the amylose content of the base starch as determined by conventional spectrophotometric iodine absorption, Sowbhagya and Bhattacharya, Die Starke 23 Jan. 1971 Nr. 2, p. 53–56.

The high amylose starch hydrolysate has a DE greater than about 5 and less than about 15. Good results have been obtained when the DE is about 5 to about 9.

The dextrose equivalent, DE, is a conventional term used to describe the degree of conversion of starch to starch hydrolysate. There are a number of methods of determining DE. For the purposes of this specification and the claims herein, the DE is determined by Lane-Eynon Procedure (E 26, Standard Analytical Methods, revision 5/27/68, CRA Manual).

The high amylose starch hydrolysate of the present invention has a peak average molecular weight of less than about 10,000 when measured by Gel Permeation Chromatography. More preferably, the high amylose starch hydrolysate of the present invention has a peak average molecular weight less than about 7500 and even more preferably about 6000 and below.

Peak average molecular weight is determined by the Gel Permeation Chromatograph using two ULTRAHYDROGEL ™ linear columns in series, each measuring 11.81 inches (30 cm) in height and 0.31 inches 0.78 cm) in diameter. 100 microliters of a 0.1% wt./vol. sample was eluted with 0.1 M $NaNO_3$ containing 0.02% ( $NaN_3$ (40° C.) at a flow rate of 0.8 cc/minute. A Refractive Index detector maintained at 40° C. is used. The peak average molecular weight is the value of the molecular weight at the highest point of the chromatogram generated by the chromatograph.

The gels made from the fat replacer of the present invention must have a gel strength of about 25 grams and above and, preferably, a gel strength of about 100 to about 1200 grams. More preferred is a gel strength between about 500 to about 1100.

The gel strength of the fat replacer of the present invention is determined by preparing an aqueous dispersion of the high amylose starch hydrolysate at 25% solids and cooking the dispersion at about 95° C. for about 15 minutes. The paste is then placed in 4 ounce short glass jars, the jars covered and placed into cold storage, 4° C., for 16 hours. After 16 hours at 4° C. the jars are allowed to stand at ambient temperature, 25° C., for 1½ hours. A Stevens LFRA Texture Analyser is then used to measure the gel strength. Plunger No. 5 is used at a speed of 0.2 mm/second and a distance of 4 mm. The average of 3 readings is used to determine the gel strength.

The term "foodstuffs" as used in the specification and claims means foods that have been formulated from more than one component. Examples of such foodstuffs are spoonable and pourable salad dressings, frozen novelties, ice cream, whipping toppings, icings, and sauces.

Replacing the fat and/or oil in order to make a reduced fat foodstuff in accordance with the present invention is accomplished by replacing at least a portion of the fat and/or oil used in formulating the foodstuff with water and an effective amount of a starch hydrolysate of the present invention. Suitably the fat replacer of the present invention is substituted for the fat and/or oil on about a 1 to 1 weight basis, i.e. about 1 gram of fat replacer for about 1 gram of fat and/or oil.

Since the caloric content of fat and/or oil is about 9 calories per gram and the caloric content of the fat replacer of the present invention in a 25% solids dispersion is about 1 calorie per gram, a caloric decrease of more than about 90% is obtained by replacing all of the fat and/or oil.

Typically, formulated foodstuffs contain up to about 80% by weight fat and/or oil. Preferably, in any foodstuffs formulated with a fat and/or oil, up to about 50% by weight of the fat and/or oil is replaced with the water and an effective amount of the starch hydrolysate of the present invention and more preferably up to about 90% of the fat and/or oil is replaced.

The high amylose starch hydrolysate of the present invention is preferably made by treating a slurry of high amylose starch with bacterial alpha amylase to the desired DE. More specifically, a high amylose starch is slurried with water to about 20% solids and the pH is adjusted to about 6. To this slurry is added about 0.4% by weight bacterial alpha amylase based on dry starch weight. This slurry is then subjected to a prepaster at a temperature of about 105° C. to gelatinize the starch The starch slurry is then held at about long enough to convert the starch to a hydrolysate having a DE greater than 5 and less than 15, typically about 30 to about 45 minutes. The enzyme is then inactivated by adjusting the pH to about 2.5. After inactivating the enzyme the pH is adjusted to about 4.5 and the slurry is filtered and carbon bleached at about 90° C. The slurry is then dried by evaporation followed by spray drying in a conventional manner. Preferably the high amylose starch hydrolysate is dried to a moisture of less than about 12% and more preferably, about 4% and below.

These and other aspects of the present invention may be more fully understood by reference to the following examples.

EXAMPLE 1

This example illustrates making a frozen novelty in accordance with the present invention. Two formulations were made. Each formulation was found to have comparable taste, appearance and mouthfeel. Table I below illustrates these formulations.

TABLE I

| Ingredient | Control % | 50% Fat Replaced Test % |
|---|---|---|
| Butter, unsweetened | 15.6 | 7.8 |
| Milk, 3.5% fat | 15.6 | 7.8 |
| Non-fat dried milk | 9.6 | 10.5 |
| Sugar | 12.0 | 12.0 |
| Corn syrup 43/42 | 4.0 | 4.0 |
| Sea Kem GP 418 | 0.2 | 0.2 |
| Lodex 10 | — | 4.5 |
| Water | 43.0 | 47.2 |
| Fat replacer | — | 6.0 |

The numbers in Table I are based on percent by weight of formulation. The fat replacer was a paste made from a high amylose starch hydrolysate wherein the DE was 8.6 and the apparent amylose content of the base starch was about 60%. The paste was made by forming an aqueous dispersion at a solids content of 25% by weight, heating the dispersion to about 100° C. and holding the dispersion at that temperature for about 5 minutes. The dispersion was stirred constantly during heating.

The gel strength of the fat replacer was about 695 grams and the hydrolysate had a peak average molecular weight of about 2874. Both gel strength and peak average molecular weight were determined as outlined above.

Both formulations were prepared by adding the preblended dry components to the butter, milk, water and corn syrup. The mix was then pasteurized, homogenized, cooled to 4° C. and aged for 24 hours. The mix was then processed in an ice cream maker. The fat replacer paste was combined with the butter, milk, water and corn syrup initially.

EXAMPLE 2

This example illustrates making a chocolate chip cookie with the fat replacer of the present invention. The cookies made by this formulation were found to have good taste, appearance and mouthfeel. Control was a chewy cookie while the test was a cake-like cookie.

TABLE II

| Ingredient | Control % | 95% Fat Replaced Test % |
|---|---|---|
| Brown sugar | 11.64 | 11.64 |
| Sugar | 5.21 | 5.21 |
| Frodex 55 | 6.39 | 6.39 |
| Salt | .48 | .48 |
| Non-fat dried milk | 1.42 | 1.42 |
| Vegetable shortening | 15.33 | .77 |
| Fat replacer | — | 14.56 |
| Lecithin | .3 | .3 |
| Whole eggs | 11.36 | 11.36 |
| Water | 8.12 | 8.12 |
| Vanilla flavor, 10X | .01 | .01 |
| Baking soda | .25 | .25 |
| Instant Polar Gel 'C' | 4.27 | 4.27 |
| Cake flour | 19.22 | 19.22 |
| Chocolate chips, 2000 ct. | 16.00 | 16.00 |

The numbers in Table II are based on the percent by weight formulation. The fat replacer used in this formulation is the same as in Example 1 above.

The cookies were made by creaming the sugar and shortening and then adding the dry ingredients to the creamed mixture. Then the liquid together with the fat replacer was added and mixed in. Finally the chocolate chips were added and the dough was dispersed and baked in a 190° C. oven for about 12 minutes.

EXAMPLE 3

This example compares the gel strength of the fat replacer of the present invention to other starch hydrolysates.

TABLE III

| Starch Hydrolysate | Base Starch | Apparent Amylose % | DE | Gel Strength (Grams) |
|---|---|---|---|---|
| 1 | Corn | 58 | 6.4 | 1171 |
| 2 | Corn | 58 | 8.6 | 695 |
| 3 | Corn | 58 | 10 | 115 |
| 4 | Potato | 20 | 6.4 | 210 |
| 5 | Potato | 20 | 10 | 33 |
| 6 | Corn | 2 | 5 | 0 |
| 7 | Corn | 2 | 10 | 0 |
| 8 | Tapioca | 17 | 1.6 | 210 |
| 9 | Corn | 28 | 4.0 | 125 |
| 10 | Tapioca | 17 | 6.0 | 44 |
| 11 | Potato | 20 | 1.4 | 874 |

The gel strength measurements were made in the manner as outlined above and the dextrose equivalents were likewise measured in the manner outlined above.

Starch hydrolysates 1-3, 6 and 7 were made in a continuous process where a slurry of starch and water was made to about 20% solids. The pH of the slurry was adjusted to about 6 and bacterial alpha amylase was added to the slurry. The slurry was then subjected to a prepaster which raised the temperature of the slurry to about 104° C. and the slurry was subsequently held at about 106° C. in plug flow convertors until the indicated DE was obtained. Then the enzyme was deactivated by adjusting the pH and the slurry was subsequently filtered, carbon bleached and spray dried to produce a dry starch hydrolysate. The base starch used for 1-3 was a high amylose corn starch while 6-7 was a waxy corn starch.

Starch hydrolysates 4 and 5 were made in accordance with Example 1 of U.S. Pat. No. 3,962,465 except different DE's were obtained. It is readily evident that the 6.4 DE and 10 DE material made in accordance with the teachings of the '465 patent did not have the gel strength of the fat replacer of the present invention.

Starch hydrolysate 8 was a commercial product sold by National Starch and Chemical Company under the trade name N-OIL. This is thought to be made from a tapioca starch and the apparent amylose content listed in Table III above for N-OIL is that of a typical tapioca starch, see 10.

Starch hydrolysate 9 is a conventional common corn starch hydrolysate converted by enzyme to the desired DE while starch hydrolysate 10 is a conventional tapioca starch hydrolysate also made by an enzymatic process to the desired DE. Starch hydrolysates 9 and 10 were made by making a slurry with the starch to a solids level of about 20% adjusting the pH to about 6; adding bacterial alpha amylase to the slurry; heating the slurry to about 80° C. and holding the slurry at this temperature until the desired DE was obtained. The enzyme was then inactivated, and the slurry filtered, bleached and dried to form a dried starch hydrolysate.

Starch hydrolysate 11 was a commercial product sold by Avebe under the name PASELLI SA-2. Such material is thought to be made from a potato starch base. The apparent amylose content listed in Table III is that of a typical potato starch, see 4 and 5.

It is apparent from Table III above that the fat replacer of the present invention has both a higher amylose content and gel strength than starch hydrolysates of comparable DE's.

EXAMPLE 4

This example compares the peak average molecular weights of the fat replacer of the present invention with other starch hydrolysates.

TABLE IV

| Starch Hydrolysate | Base Starch | Apparent Amylose (%) | DE | Peak Average Molecular Weight |
|---|---|---|---|---|
| 12 | Potato | 20 | 1.4 | 177,500 |
| 13 | Tapioca | 17 | 0.3 | 45,300 |
| 14 | Tapioca | 17 | 0 | 167,500 |
| 15 | Corn | 58 | 5.3 | 4,180 |
| 16 | Corn | 58 | 8.6 | 2,784 |
| 17 | Potato | 20 | 6.4 | 24,460 |

Starch hydrolysate 12 was a commercial product sold by Avebe under the name PASELLI SA-2. It was thought that this material was made from potato starch and the amylose content as reported above is typical for potato starches.

Starch hydrolysates 13 and 14 were commercial products sold by National Starch and Chemical Company under the names N-OIL and INSTANT N-OIL respectively.

Starch hydrolysates 15 and 16 were made in accordance with the present invention.

Starch hydrolysate 17 was made in accordance with Example 1 of U.S. Pat. No. 3,962,465.

It will be understood that the claims are intended to cover all modifications and changes of the preferred embodiment of the invention herein chosen for illustration which do not constitute a departure from the spirit and scope of the invention.

What is claimed is:

1. A method for preparing a foodstuff with reduced fat comprising the step of replacing at least a portion of the fat and/or oil in a fat and/or oil-containing foodstuff with water and an effective amount of a single high amylose starch hydrolysate having a DE between about 5 and about 15 and a peak average molecular weight less than 10,000, said starch hydrolysate being made from a base starch having an apparent amylose content greater than 40% and said starch being obtained from corn, said starch hydrolysate characterized in that aqueous dispersions thereof at about 25% by weight solids are capable of forming a gel having a strength of about 25 grams and above; said starch hydrolysate being formed from said base starch by rapidly heating a slurry of base starch and enzyme above about 105° C. and converting said base starch to said starch hydrolysate at a temperature below about 105° C.

2. The method of claim 1 wherein the starch has an apparent amylose content of about 60%.

3. The method of claim 1 wherein the high amylose starch hydrolysate is in the form of an aqueous dispersion.

4. The method of claim 3 wherein the aqueous dispersion is a paste.

5. The method of claim 3 or 4 wherein the aqueous dispersion has a solids content of about 5 to about 50% by weight.

6. The method of claim 1 wherein the foodstuff is selected from the group consisting of spoonable and pourable salad dressings, frozen novelties, ice cream, whipping toppings, icings, cookies and sauces.

7. The method of claim 1 wherein up to about 90% of the fat and/or oil is replaced with the high amylose starch hydrolysate.

8. A method for preparing a foodstuff with reduced fat comprising the following sequential steps:
 (a) forming a slurry of high amylose corn starch;
 (b) mixing about 0.4% by weight bacteria alpha amylase base on dry starch weight with said slurry;
 (c) gelatinizing said corn starch at a temperature of about 105°) C;
 (d) holding said gelatinized corn starch at about 80°) C. until the DE reaches about 5 to about 9;
 (e) recovering a high amylose corn starch hydrolysate having a DE between about 5 to about 9; and
 (f) replacing up to about 90% of the fat and/or oil in a fat and/or oil-containing foodstuff with said water and high amylose corn starch hydrolysate.

9. The method of claim 9 wherein the high amylose corn starch hydrolysate is in the form of a paste with a solids content between about 5 to about 50% when added to said foodstuff.

10. A foodstuff made by the process of claim 1.

11. A foodstuff made by the process of claim 8.

12. A foodstuff made by the process of claim 9.

13. A method for preparing a foodstuff with reduced fat comprising the step of replacing at least a portion of the fat and/or oil in a fat and/or oil-containing foodstuff with water and an effective amount of a single high amylose starch hydrolysate having a DE between about 5 and about 15; a peak average molecular weight less than 10,000; said starch hydrolysate characterized in that an aqueous dispersion thereof at about 25% by weight solids is capable of forming a gel having a strength of about 25 grams and above; and said starch hydrolysate being made from a base starch having an apparent amylose content greater than 40%, said starch hydrolysate being made by the steps of forming a slurry of said base starch and an enzyme; rapidly heating said slurry to a temperature of about 105° C. to gelatinize said base starch; converting said base starch at a temperature below about 105° C. to gelatinize said base starch; converting said base starch at a temperature below about 105° C. to said starch hydrolysate; and recovering said starch hydrolysate.

14. The method of claim 13 wherein the base starch is high amylose corn starch.

15. The method of claim 14 wherein the apparent amylose content is about 50% and above.

16. The method of claim 13 wherein the step of converting the base starch to the starch hydrolysate is conducted at about 80° C.

17. The method of claim 13 wherein the enzyme is a bacterial alpha-amylase.

18. The method of claim 13 wherein the starch hydrolysate has a DE between about 5 and about 9.

19. The method of claim 13 wherein the slurry formed has a solids content of about 20% by weight.

20. A foodstuff made by the process of claim 14.

* * * * *

UNITED STATES PATENT AND TRADEMARK OFFICE
CERTIFICATE OF CORRECTION

PATENT NO. : 5,094,872                               Page 1 of 2
DATED      : March 10, 1992
INVENTOR(S): Susan L. Furcsik et al.

It is certified that error appears in the above-identified patent and that said Letters Patent is hereby corrected as shown below:

Column 2, line 31, after "amylose" insert --corn starch is available from American Maize- --.

Column 2, line 32, change "Amaizo ®5" to --Amaizo®5--.

Column 2, line 64, change "(NaN3" to --NaN3--.

Column 3, line 55, after "about" insert --80°C--.

Column 6, line 1, delete ",#".

Column 6, line 25, change "2,784" to --2,874--.

Column 7, line 20, change "105°)C" to --105°C to gelatinize said corn starch--.

Column 7, line 21, change "80°)" to --80°--.

Column 7, line 23, before "high" insert --single--.

Column 7, line 24, after "9" insert --, said starch hydrolysate characterized in that aqueous dispersions thereof at about 25% by weight solids are capable of forming a gel having a strength of about 25 grams and above--.

UNITED STATES PATENT AND TRADEMARK OFFICE
CERTIFICATE OF CORRECTION

PATENT NO. : 5,094,872

DATED : March 10, 1992

INVENTOR(S) : Susan L. Furcsik et al.

It is certified that error appears in the above-identified patent and that said Letters Patent is hereby corrected as shown below:

Column 7, line 27, before "high" insert --said single--.

Signed and Sealed this

Twenty-second Day of June, 1993

Attest:

MICHAEL K. KIRK

*Attesting Officer*   Acting Commissioner of Patents and Trademarks

UNITED STATES PATENT AND TRADEMARK OFFICE
CERTIFICATE OF CORRECTION

PATENT NO. : 5,094,872
DATED : March 10, 1992
INVENTOR(S) : Susan L. Furcsik et al.

It is certified that error appears in the above-identified patent and that said Letters Patent is hereby corrected as shown below:

Col. 8, Claim 13, lines 17-19, delete "gelatinize said base starch; converting said base starch at a temperature below about 105° C. to"

Signed and Sealed this

Thirteenth Day of July, 1993

Attest:

MICHAEL K. KIRK

Attesting Officer

Acting Commissioner of Patents and Trademarks